Figure 1:
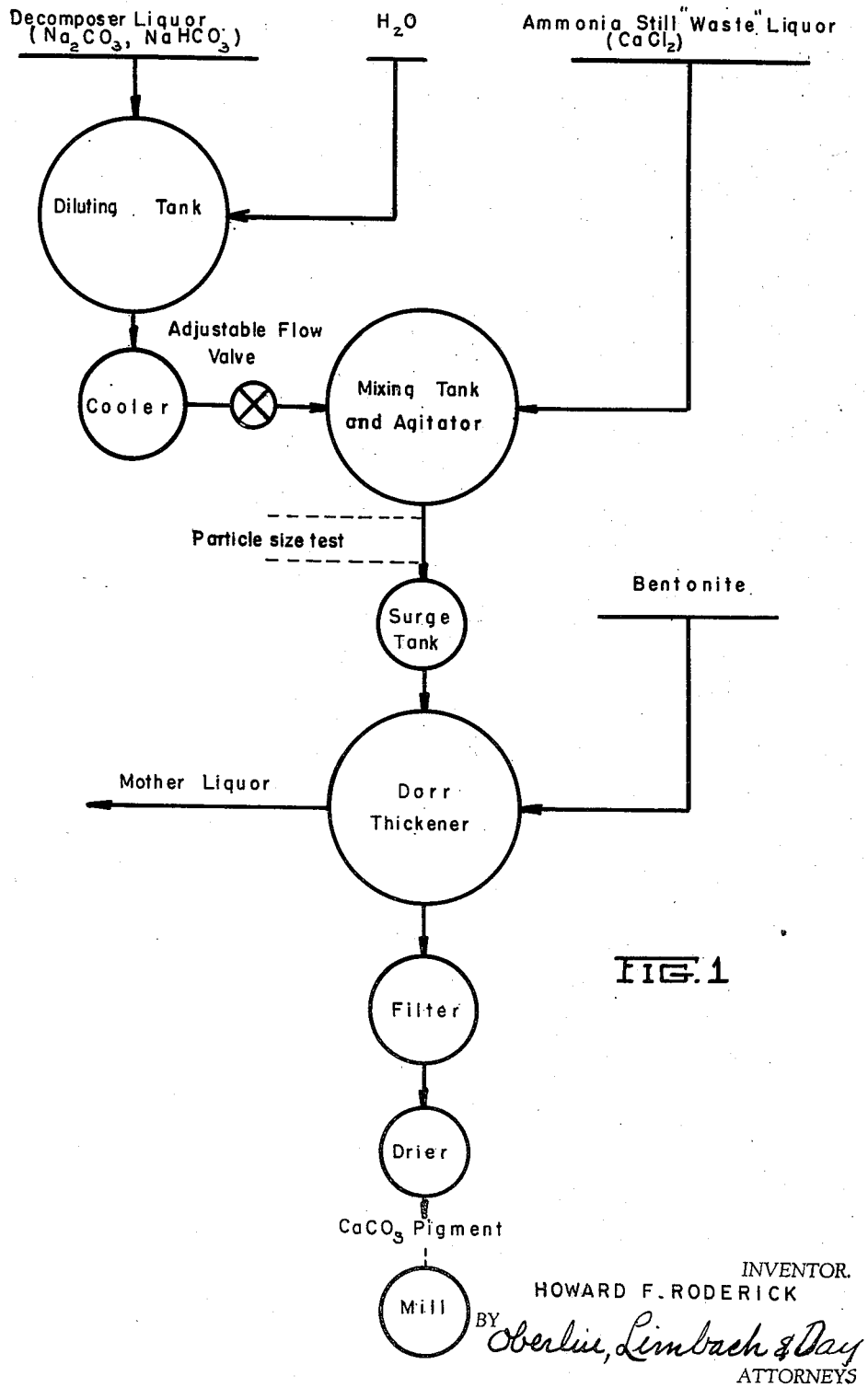

Sept. 8, 1942.    H. F. RODERICK    2,295,291
METHOD OF CONTROLLING PARTICLE SIZE IN MANUFACTURE
OF CALCIUM CARBONATE PIGMENT
Filed Jan. 30, 1939    2 Sheets-Sheet 2

INVENTOR.
HOWARD F. RODERICK
BY Oberlin, Limbach & Day
ATTORNEYS

Patented Sept. 8, 1942

2,295,291

UNITED STATES PATENT OFFICE 2,295,291

METHOD OF CONTROLLING PARTICLE SIZE IN MANUFACTURE OF CALCIUM CARBONATE PIGMENT

Howard F. Roderick, Grosse Isle, Mich., assignor to Michigan Alkali Company, Wyandotte, Mich., a corporation of Michigan Application January 30, 1939, Serial No. 253,492

8 Claims. (Cl. 23—66)

The present invention relates to the manufacture of a calcium carbonate coating pigment particularly adapted for use as a paper coating material. In my copending application Serial No. 148,347, filed June 15, 1937, I have disclosed such a pigment which possesses the desired requisites of good ink receptivity, covering power, brightness, smoothness, and above all, a relatively low glue or adhesive requirement. As is taught by such copending application, such requisites are achieved by a certain particle size distribution produced during the manufacture of calcium carbonate.

The present invention deals basically with the reaction between sodium carbonate and calcium chloride and wherein the calcium carbonate is derived as a precipitated product. Most suitably, the reaction is carried out on a commercial scale as an adjunct to the ammonia soda process, the source of material supply for the sodium carbonate and the calcium chloride reagent solutions being derived from the decomposer liquor and ammonia still waste liquor, respectively, from an ammonia soda process plant.

The aforesaid application further teaches that the desired particle size distribution of the precipitated calcium carbonate from the last mentioned chemical reaction is dependent upon the following factors: temperature, rate of agitation of the mixture of the reagent solutions, presence of an excess of calcium chloride, and ratio of concentration of sodium carbonate to sodium bicarbonate. The present invention constitutes an improvement in the aforesaid process in that it pertains to a practical and efficient method for controlling the effects of these factors, and also involves the discovery of a new and important factor in the control and determination of particle size of the resultant product.

The present invention also embodies a novel improvement in the manufacture of calcium carbonate pigment, particularly in respect to maintaining the desired particle size once it has been obtained and during the later stages of the process of manufacture. The latter improvement not only accomplishes a uniformity of production, but also enhances the properties and qualities of the resultant product.

To the accomplishment of the foregoing and related ends, said invention, then, consists of the means hereinafter fully described and particularly pointed out in the claims, the annexed drawings, and the following description setting forth in detail certain means and one mode of carrying out the invention, such disclosed means and mode illustrating, however, but one of various ways in which the principle of the invention may be used.

In said annexed drawings—

Figure 2:
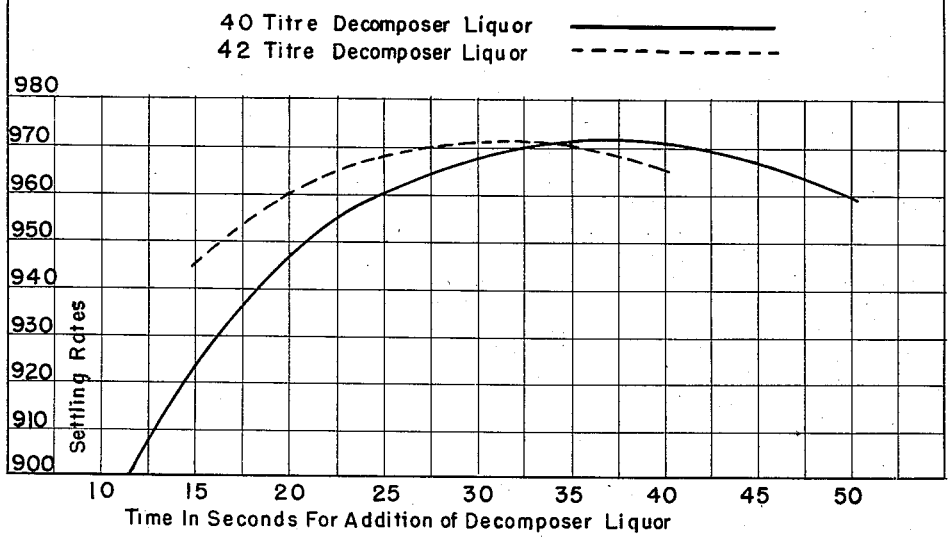
Figure 3:
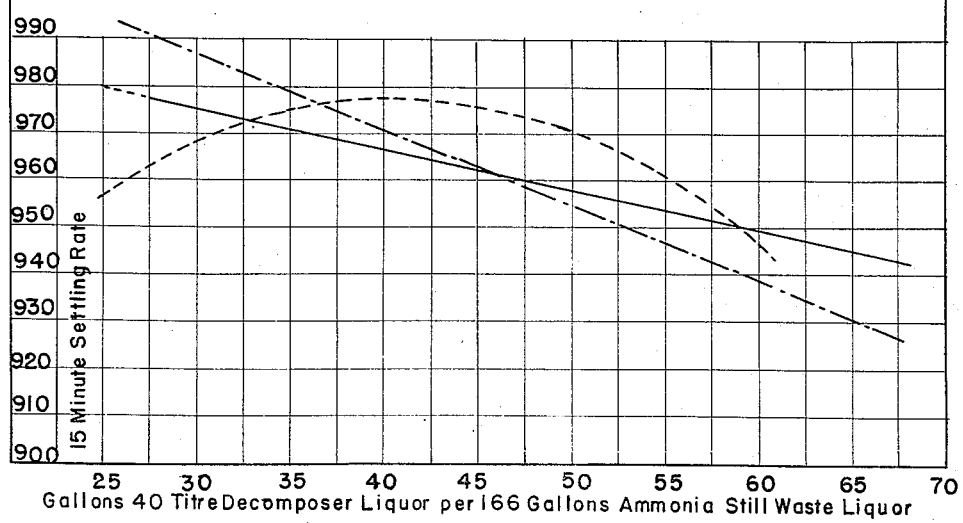

Fig. 1 is a flow sheet illustrating the operations involved in the performance of the invention; Fig. 2 is a coordinate diagram illustrating the effect of change in the ratio of addition of the decomposer liquor to the ammonia still waste liquor upon the resultant particle size of the precipitated calcium carbonate; and Fig. 3 is a coordinate diagram illustrating the effect of change in percentage of excess calcium chloride upon the calcium carbonate particle size.

Now referring to Fig. 1, it will be seen that the starting materials of the process are essentially decomposer liquor, containing sodium carbonate and sodium bicarbonate and ammonia still waste liquor containing essentially calcium chloride. The decomposer liquor is first diluted with water to a concentration, for example, of 40 titre on a 10 c. c. sample, then passed through a cooler or tubular heat exchanger, where its temperature is reduced to a predetermined amount. Due to the control effected by such factors as will hereinafter be pointed out, this temperature need not be critical, nor occur in a critical range, as long as the temperature of the subsequent reaction with the calcium chloride or ammonia still waste liquor is kept constant.

The ammonia still waste liquor consists essentially of a solution of calcium chloride, and is then introduced into the mixing and agitating tank. The decomposer liquor from the cooler is preferably added to the calcium chloride solution in the mixing tank at a controlled rate of flow, such as by an adjustable flow valve. The rate of agitation in the mixing and agitating tank is, like the temperature, kept constant.

I have discovered that with the factors of temperature, rate of agitation, percentage excess of calcium chloride and ratio concentration of sodium carbonate to sodium bicarbonate in the decomposer liquor, all maintained at a constant value, that variations in the resultant particle size of the precipitated calcium carbonate can be obtained by means of regulating the rate of addition of the decomposer liquor.

The following table sets forth the settling rates of precipitated calcium carbonate samples (taken in a 1000 cc. graduate) according to the various rates of addition of the decomposer liquor. The settling rate values are inversely proportional to the particle size. Thus, the lower the settling rate reading, the larger the particle size; or as otherwise stated, the slower the settling rate, the smaller the particles.

| Time allowed for addition of decomposer liquor (seconds) | Settling rates obtained (readings on 1,000 c. c. graduate) | |
|---|---|---|
| | 40 titre decomposer liquor | 42 titre decomposer liquor |
| 15 | 910 | 940 |
| 15 | 938 | 940 |
| 15 | 925 | |
| 15 | 920 | |
| 18 | 940 | 955 |
| 18 | 925 | 955 |
| 19 | 955 | 965 |
| 19 | 955 | 960 |
| 24 | 965 | 965 |
| 25 | 970 | 965 |
| 25 | 970 | 960 |
| 29 | 960 | |
| 30 | 965 | |
| 34 | 975 | |
| 35 | 970 | 965 |
| 35 | 975 | 970 |
| 35 | 975 | 970 |
| 40 | 965 | 965 |
| 40 | 965 | |
| 42 | 970 | |
| 40 | 965 | |
| 50 | 960 | |

The results of the above table are graphically illustrated in Fig. 2.

Thus, by selecting the exact time for the addition of the decomposer liquor, or the rate of addition thereof, any definite corresponding particle size of the precipitated product can be obtained, and of course, assuming that the other factors of temperature, rate of agitation, percentage of excess calcium chloride, and ratio of concentration of sodium carbonate to bicarbonate are constant.

As a practical matter, the factors of temperature and rate of agitation are very easily maintained at constant values. However, it is much more difficult to so regulate the concentration of the decomposer liquor. Thus, the strength of the decomposer liquor might be found to undergo variation due to low salt runs, leaky tubes in the still, low lime Twadell, double dissolver runs and direct dilution with water. In commercial production, the correction of such variations by readjusting the strength and concentration of the decomposer liquor presents obvious practical difficulties. As will be seen from the foregoing table, and also as taught in my copending application Serial No. 148,347, the particle size of the calcium carbonate varies in direct proportion to the ratio of concentration of the sodium carbonate to sodium bicarbonate in the decomposer liquor (which ratio is in the range of 2½–3½ to 1.) Therefore, such variations in strength and concentration of the decomposer liquor over the range indicated can very easily and practicably be corrected and compensated for by control of the rate of addition of the latter to the mixing tank.

Particle size tests, made according to the settling rate method and upon samples taken from the mixing tank from time to time, serve as means for determining the rate of decomposer liquor addition necessary.

The particle size of the precipitated calcium carbonate is also effected by the percentage of excess calcium chloride introduced into the mixing tank. The following table is exemplary of this effect:

*The addition of varying amounts of 40 titre decomposer liquor to a fixed amount of ammonia still waste liquor containing 111 g./1 CaCl$_2$*

| Per cent excess CaCl$_2$ | Amount of ammonia still waste liquor taken (gallons) | Amount of decomposer liquor added (gallons) | Time of addition (sec.) | 15 min. settling rate (1,000 c. c. graduate) |
|---|---|---|---|---|
| (Adding decomposer liquor fast.) | | | | |
| 182 | 166 | 27.6 | 7 | 978 |
| 110 | 166 | 36.8 | 8 | 970 |
| 57 | 166 | 47.7 | 10 | 958 |
| 34 | 166 | 57.9 | 12 | 951 |
| (Adding decomposer liquor slowly.) | | | | |
| 182 | 166 | 27.6 | 12 | 962 |
| 110 | 166 | 36.8 | 16 | 978 |
| 57 | 166 | 47.7 | 20 | 973 |
| 34 | 166 | 57.9 | 24 | 955 |
| (Adding larger volume ammonia still waste liquor; ammonia still waste liquor=112 g./l. CaCl$_2$.) | | | | |
| 81 | 249 (166)[1] | 65 (43)[1] | 15 | 978 |
| 50 | 207 (166) | 65 (52) | 15 | 955 |
| 60 | 221 (166) | 65 (49) | 15 | 956 |
| 35 | 187 (166) | 65 (58) | 15 | 947 |
| 19 | 166 (166) | 65 (65) | 15 | 935 |
| 11 | 148 (166) | 65 (70) | 15 | 920 |

[1] Calculated to basis of 166 gal. ammonia still waste liquor for purpose of comparison.

The results of the foregoing table are graphically illustrated in Fig. 3. Thus, it will be seen that an increase in the excess calcium chloride tends to produce smaller particle size. However, in the curve representing the slow rate of addition of decomposer liquor, a point in maximum settling rate reading or minimum particle size is reached (at about 100% excess calcium chloride), which is apparently due to the prevailing effect of the rate of addition of the decomposer liquor.

Thus the control of particle size can be had also by varying the percentage of excess calcium chloride, in addition to the variation in the rate of addition of the decomposer liquor. The latter control factor, however, is the most practical and convenient one, since it most readily lends itself to manipulation.

After the operation in the mixing and agitating tank is completed, its contents are dumped into a surge tank, and thence to a Dorr thickener or similar apparatus capable of increasing the concentration of the precipitated product prior to filtration. In order to maintain particle size as originally produced and to prevent crystalline growth of the calcium carbonate, a protective colloid such as bentonite (otherwise known as taylorite, Denver mud, Denver clay, paper clay, soap clay and gumbo) is added. The bentonite which is a variety of bedded clay having a great affinity for water is initially in the form of a dry powder which must be dispersed in water before use in the process. Such dispersion is accomplished by adding the bentonite to hot water and applying steam while agitating.

The precise scientific principle upon which the addition of this protective colloid or bentonite operates is not presently ascribable. However, it is possible that the bentonite coats the particles of calcium carbonate with a protective film which prevents the growth of the carbonate crystals, and it is also possible that such action may be due to a neutralization of the electronic charge on the calcium carbonate particles. Suffice it to say that the results of the addition of the bentonite are such as to maintain the desired particle size of the calcium carbonate as it is originally precipitated, to substantially improve the wetting characteristics of the calcium carbonate pigment, and also to produce a more rapid settling or removal of the calcium carbonate from the mother liquor.

It has been also found that the addition of the protective colloid or bentonite improves the glue or adhesive requirement of the dried calcium carbonate product. In fact, it has been found that such improvement is of a sufficient amount to permit the omission of additional processing of the dried product, such as milling. In other words, the bentonite addition effects an improvement in the glue requirements of the dried, unmilled product commensurate with the corresponding properties of the milled product. Referring again to Fig. 1, after the addition of the bentonite, the calcium carbonate sludge is filtered, washed and dried to produce the final product. This dried product may optionally be further milled, but as last pointed out, it has satisfactory qualities to be used without milling.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:

1. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution at a relatively fast rate when the smaller particle size limit of said predetermined range is approached and at a relatively slow rate when the larger particle size limit thereof is approached.

2. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a range the limits of which are determined by 910 and 970 settling rate readings on a 1000 c. c. graduate in a fifteen minute period, by introducing the sodium carbonate solution at a relatively fast rate when the 970 settling rate reading limit is approached, and at a relatively slow rate when the 910 settling rate limit is approached.

3. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution in a period of time ranging from fifteen to fifty seconds, said sodium carbonate being added in a relatively shorter time when the smaller particle size limit of said predetermined range is approached, and in a relatively longer time when the larger particle size limit of said predetermined range is approached.

4. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution in a period of time ranging from fifteen to fifty seconds, said sodium carbonate being added in a relatively shorter time when the 970 settling rate reading limit is approached, and in a relatively longer time when the 910 settling rate reading limit is approached.

5. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution at a relatively fast rate when the smaller particle size limit of said predetermined range is approached and at a relatively slow rate when the larger particle size limit thereof is approached, and then adding bentonite to the reacted solutions, whereby the crystalline growth of the precipitated calcium carbonate particles is prevented.

6. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a range the limits of which are determined by 910 and 970 settling rate readings on a 1000 c. c. graduate in a fifteen minute period, by introducing the sodium carbonate solution at a relatively fast rate when the 970 settling rate reading limit is approached, and at a relatively slow rate when the 910 settling rate limit is approached, and then adding bentonite to the reacted solutions, whereby the crystalline growth of the precipitated calcium carbonate particles is prevented.

7. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution in a period of time ranging from fifteen to fifty seconds, said sodium carbonate being added in a relatively shorter time when the smaller particle size limit of said predetermined range is approached, and in a relatively longer time when the larger particle size limit of said predetermined range is approached, and then adding bentonite to the reacted solutions, whereby the crystalline growth of the precipitated calcium carbonate particles is prevented.

8. In the manufacture of calcium carbonate precipitated from reacting solutions of sodium carbonate and calcium chloride, said solutions being derived from decomposer liquor and ammonia still waste liquor respectively of the ammonia soda process, during which reaction the conditions of temperature, concentration, excess calcium chloride and agitation have an effect upon the precipitated particle size, the improvement which consists in compensating for the effect of any variation in the aforesaid conditions and maintaining the resultant particle size within a predetermined range by introducing the sodium carbonate solution to the calcium chloride solution in a period of time ranging from fifteen to fifty seconds, said sodium carbonate being added in a relatively shorter time when the 970 settling rate reading limit is approached, and in a relatively longer time when the 910 settling rate reading limit is approached, and then adding bentonite to the reacted solutions, whereby the crystalline growth of the precipitated calcium carbonate particles is prevented.

HOWARD F. RODERICK.